April 28, 1936. W. N. JACKS 2,038,936
PLOW
Filed Oct. 23, 1935
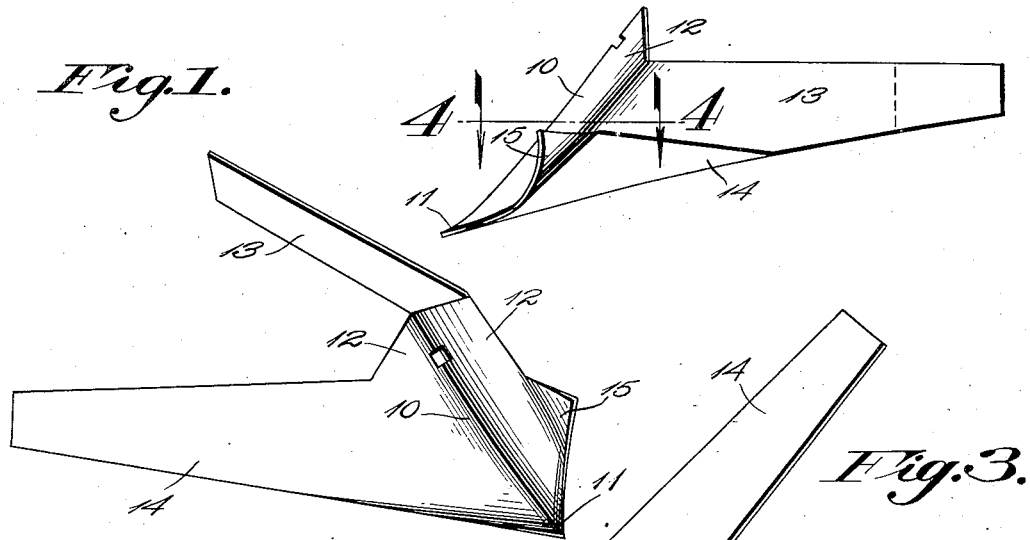
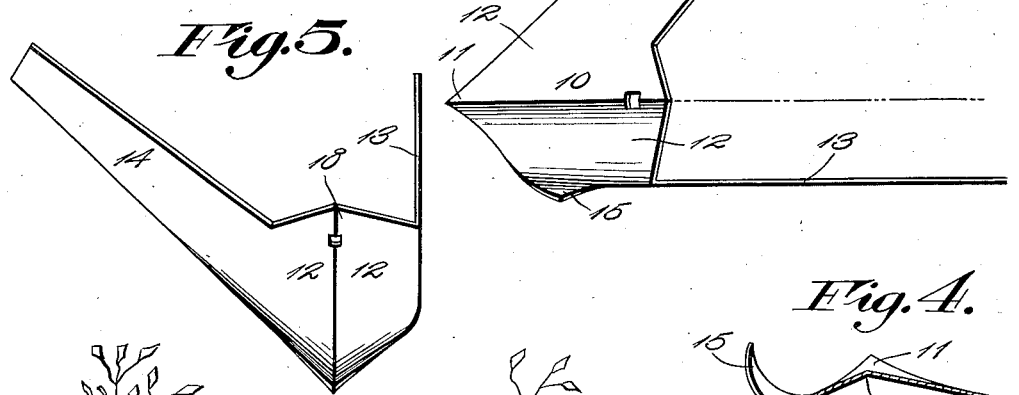
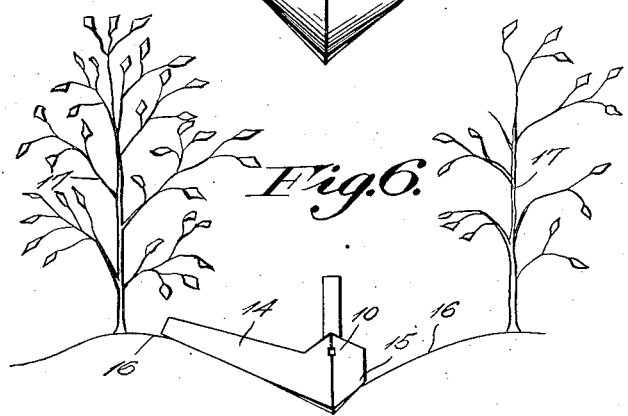
William N. Jacks
INVENTOR
BY Victor J. Evans & Co.
ATTORNEY Patented Apr. 28, 1936

2,038,936

UNITED STATES PATENT OFFICE 2,038,936

PLOW

William N. Jacks, Stewart, Miss.

Application October 23, 1935, Serial No. 46,416

1 Claim. (Cl. 97—205)

The invention relates to plows and more especially to that type known as lay-by plows.

The primary object of the invention is the provision of a plow of this character, wherein the same is formed from a single piece of material shaped to provide a plow having a drag bar and a wing, these being so disposed that when the plow is drawn between the hills of the growing crop of plants the root system of the plants will not be disturbed and the earth will be loosened and moved toward the growing plants so as to be distributed equally from the point of the plow to the trunks of the plants and the roots of the latter will be maintained covered so as to remain in moist soil or dirt.

Another object of the invention is the provision of a plow of this character, wherein the construction thereof is novel in form and in the use of the same it will assure a healthy condition to growing plants of a crop to increase the yield of such crop and will thoroughly work the soil without detriment to the roots of the plants or damaging their growth.

A further object of the invention is the provision of a plow of this character, which is simple in construction, thoroughly reliable and efficient in its purpose, readily and easily attached to any standard cultivator or plow stock, strong, durable, and inexpensive to manufacture.

With these and other objects in view, the invention consists in the features of construction, combination and arrangement of parts as will be hereinafter more fully described, illustrated in the accompanying drawing which discloses the preferred embodiment of the invention and pointed out in the claim hereunto appended.

In the accompanying drawing:

Figure 1 is a perspective view of a plow constructed in accordance with the invention.

Figure 2 is a side elevation thereof.

Figure 3 is a top plan view.

Figure 4 is a sectional view on the line 4—4 of Figure 2 looking in the direction of the arrows.

Figure 5 is an elevation of a slight modification.

Figure 6 is a pictorial representation of the plow in action of that construction shown in Figures 1 to 4, inclusive.

Similar reference characters indicate corresponding parts throughout the several views in the drawing.

Referring to the drawing in detail, particularly Figures 1 to 4, inclusive, the plow comprises a body 10 having a forwardly tapered point 11, the body at opposite sides of the longitudinal median is reversely angled as at 12 and both sides being disposed in a forward sloping condition. Formed with and bent from one of the sides of the body 10 is a drag bar 13 which is disposed perpendicularly and extends rearwardly in parallelism with the line of draft of the plow while the other side of the body 10 is formed with a rearwardly tapered forwardly inclined angled wing 14 which in length is shorter than the drag bar 13 and has a lateral spread under the disposition thereof with respect to the body 10.

The body 10 of the plow at the rear lowermost corner thereof next to the drag bar is formed with a laterally and forwardly curled lip 15 which functions to throw loose earth in the direction of the wing 14 when the plow is active between the hills 16 of growing plants 17 of a crop. The working position of the plow when carried by a cultivator or a plow stock is clearly shown in Figure 6 of the drawing and its point penetrates the soil or earth midway between the hills and the growing plants so that the loose earth as created by the working of the plow will be thrown toward the trunks of the growing plants in one hill and such plow will not disturb the root system of such plants while the loose earth will be distributed equally from the point of the plow in the direction of the trunks of the plants.

In Figure 5 of the drawing the plow body 18, which is similar to the body 10 with the drag bar 13 and wing 14 is devoid of the lip 15.

In the use of the plow the soil or earth will be thoroughly worked to assure health to the growing plants and without disturbing or destroying the root system thereof and the plow in its entirety is made from a single piece of sheet steel which is bent and formed to give rigidity and strength to the plow in its entirety and also to function as hereinbefore stated.

What is claimed is:

A plow comprising a forwardly inclined body having an outwardly tapered point and reversely beveled sides opposite the longitudinal median, a drag bar extending from one of the said sides and disposed perpendicular, a wing at the other side and disposed at a forward inclination and convergent toward the point, and a laterally and forwardly curled lip at the side having the drag bar and spaced rearwardly from the point.

WILLIAM N. JACKS.